United States Patent [19]

Hashimoto

[11] Patent Number: 4,965,501
[45] Date of Patent: Oct. 23, 1990

[54] SERVO CIRCUIT

[75] Inventor: Shuichi Hashimoto, Tokyo, Japan

[73] Assignee: Fujitsu Limited, Kawasaki, Japan

[21] Appl. No.: 472,636

[22] Filed: Jan. 30, 1990

[30] Foreign Application Priority Data

Jan. 30, 1989 [JP] Japan ................................. 01-017774

[51] Int. Cl.$^5$ ............................................ G05B 13/00
[52] U.S. Cl. ...................................... 318/595; 318/561;
318/632; 360/77.03; 360/78.07
[58] Field of Search ............................... 318/560-640;
360/65-79

[56] References Cited

U.S. PATENT DOCUMENTS

| | | | |
|---|---|---|---|
| 4,096,425 | 6/1978 | Brown et al. | 318/561 |
| 4,184,108 | 1/1980 | Sordello et al. | 318/603 X |
| 4,219,765 | 8/1980 | Morsing | 318/561 |
| 4,331,987 | 5/1982 | Oda et al. | 360/78.07 |
| 4,574,227 | 3/1986 | Herder et al. | 318/561 X |
| 4,578,723 | 3/1986 | Betts et al. | 360/67 X |
| 4,609,855 | 9/1986 | Andrews | 318/561 |
| 4,633,423 | 12/1986 | Bailey | 318/632 X |
| 4,775,903 | 10/1988 | Knowles | 360/78.07 |
| 4,827,200 | 5/1989 | Ogura et al. | 318/561 |
| 4,887,173 | 12/1989 | Sengoku et al. | 360/77.03 X |

Primary Examiner—William M. Shoop, Jr.
Assistant Examiner—Paul Ip
Attorney, Agent, or Firm—Staas & Halsey

[57] ABSTRACT

A servo circuit having a speed detection circuit for detecting a real speed from a position signal from an object under servo control; a speed error detection circuit for generating a speed error signal between a target speed and the real speed; a position error detection circuit for generating a position error signal from the position signal; a switching unit for switching connection of the servo object to the speed error detection circuit or the position error detection circuit and supplying a control current to the servo object; a control current detection circuit for detecting said control current and generating a current sensing signal; and a main processing unit for controlling the switching of the switching unit and controlling the operation of the overall servo circuit, near the target seek position, wherein provision is made of: (a) a gain setting signal preparing unit which prepares gain setting signals which set detection gains; (b) said main processing unit which supplies a target speed gain setting signal prepared by the gain setting signal preparing unit and reference target speed to the speed error detection circuit and supplies the gain setting signals of the velocity and current sensing signals to the speed detection circuit; and (c) a speed detection gain adjustment unit which preforms control to vary the detection gains of the velocity and current sensing signals in the speed detection circuit in accordance with the gain setting signals of the velocity and current sensing signals.

5 Claims, 9 Drawing Sheets

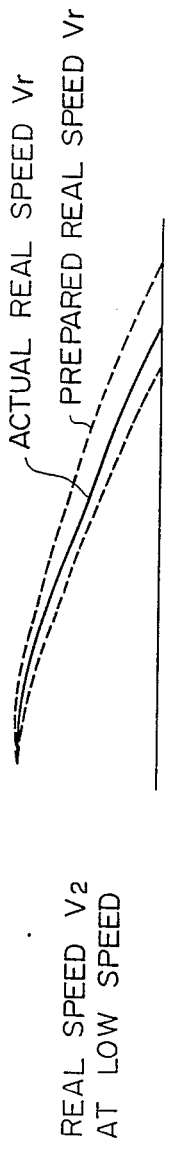
Fig. 2A PRIOR ART  VELOCITY Vps
Fig. 2B PRIOR ART  REAL SPEED $V_2$
Fig. 2C PRIOR ART  REAL SPEED $V_2$ AT LOW SPEED

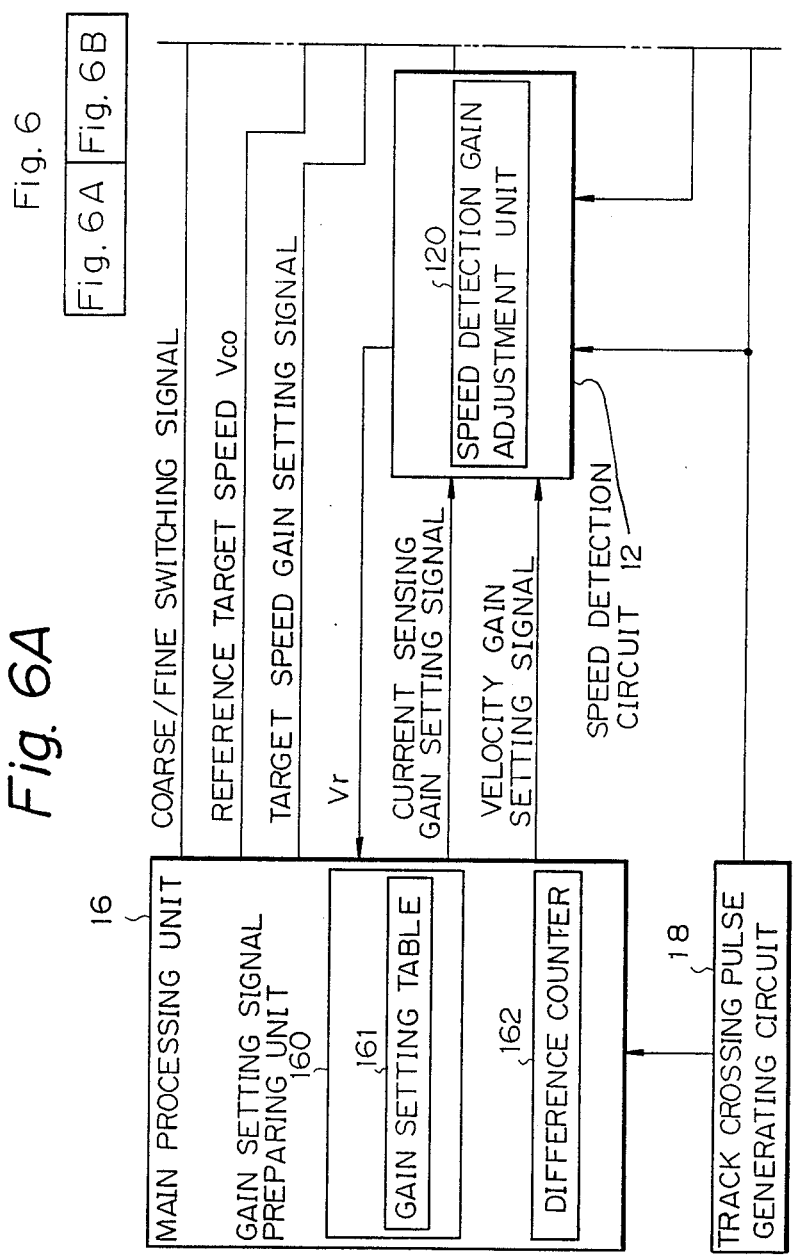

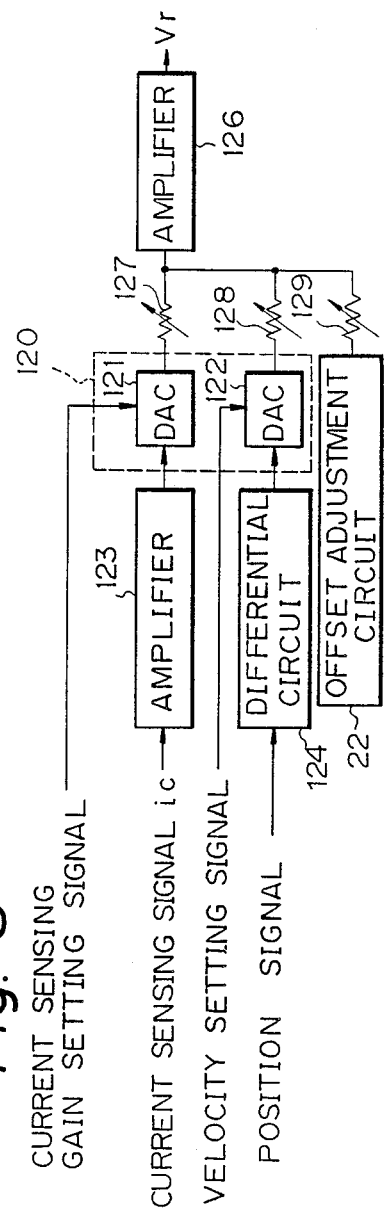

SERVO CIRCUIT

BACKGROUND OF THE INVENTION (1) Field of The Invention

The present invention relates to a servo circuit for controlling the positioning of an object under servo control (hereinafter referred to as a "servo object") to a target position by speed control and then position control.

(2) Description of the Related Art

Wide use is being made of servo positioning circuits for the positioning of magnetic heads on tracks of magnetic disk devices. In such servo positioning circuits, there is a desire for a technique enabling stable positioning even at high speeds.

That is, in the speed control of conventional servo circuits, at the stage of acceleration control at the start of the speed control, due to the overly large difference between the real speed and the target speed of the voice coil motor, linear control of the control current flowing through the voice coil motor is not possible and there results a state of voltage control such that closed loop control by the servo circuit cannot be performed for that period.

If closed loop control cannot be performed, then the control current for the acceleration control flows uncontrolled. Therefore, the rise of the current is large, resulting in oscillation of the voice coil motor. At the stage of acceleration control, parasitic oscillation easily occurs and further the parastic oscillation cannot be suppressed, so turns into residual oscillation. This has the problem of reducing the seek speed and hindering high speed seek operations.

In particular, along with the increasingly higher speeds of seek operations as in recent years, the seek speed has been shortened to a value close to the cycle of the residual oscillation, making the problem of easy occurrence of residual oscillation much worse.

SUMMARY OF THE INVENTION

The present invention has as its object the prevention of occurrence of parasitic oscillation at the stage of acceleration control so as to effectively suppress residual oscillation and to improve the seek operation speed so as to enable high speed seek operations.

The present invention realizes this object by providing a servo circuit having a speed detection circuit for detecting a real speed from a position signal from an object under servo control; a speed error detection circuit for generating a speed error signal between a target speed and the real speed; a position error detection circuit for position control; a switching unit for switching connection of the servo object to the speed error detection circuit or the position error detection circuit and supplying a control current; a control current detection circuit for detecting the control current and generating a current sensing signal; and a main processing unit for overall control, seek control being performed by speed control and then position control; wherein the detection gains of the target speed, current sensing, and velocity detected from position signal are changed to increase the target speed along with a decrease in the remaining amount of seek operation at the acceleration control stage.

BRIEF DESCRIPTION OF THE DRAWINGS

FIGS. 2A to 2C are waveform diagrams of the operation of the conventional servo circuit;

FIGS. 6A and 6B are explanatory views of the constitution of an embodiment of the present invention;

FIG. 7 is an explanatory view of the gain setting table used in the same embodiment;

FIG. 8 is an explanatory view of a speed detection circuit of the same embodiment.

DESCRIPTION OF THE PREFERRED EMBODIMENTS

Before describing the preferred embodiments, a more detailed explanation will be given of the prior art.

FIG. 1 to FIGS. 3A and 3B are explanatory views of a conventional servo circuit and its operating characteristics.

Figure 1:
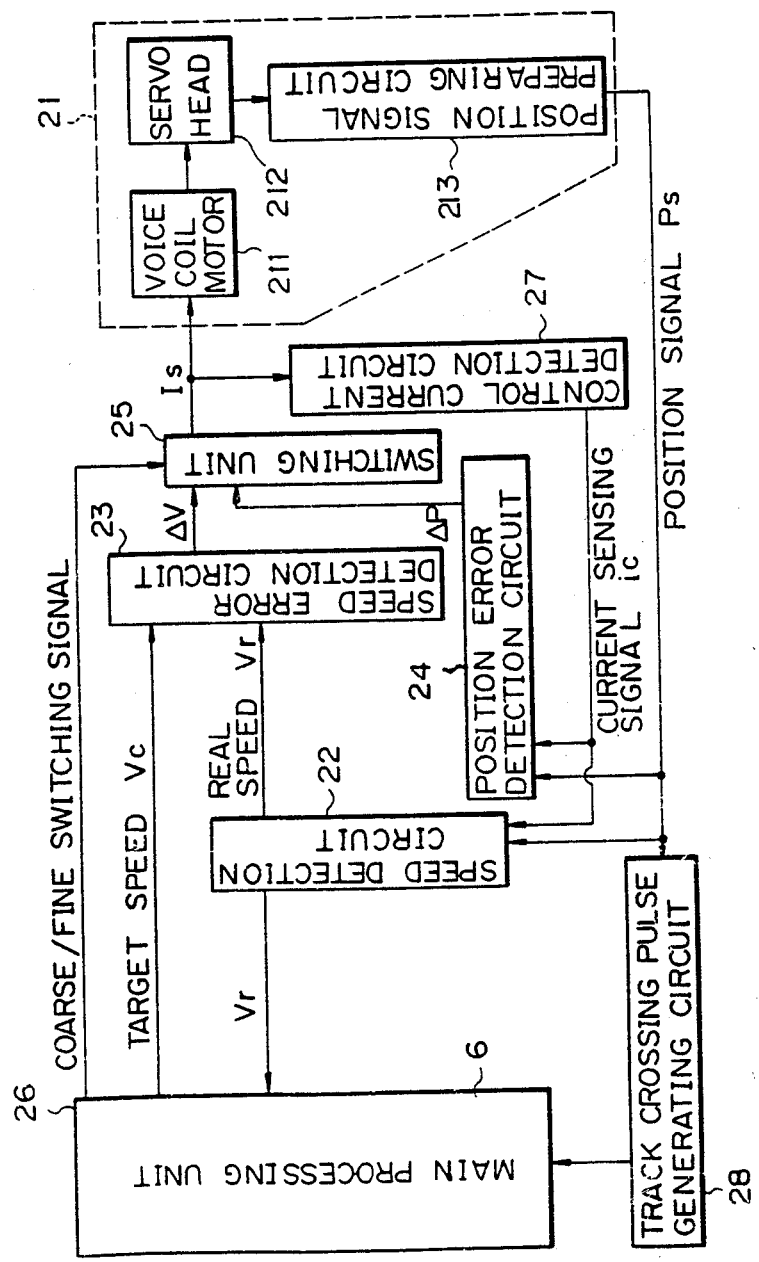
FIG. 1 is an explanatory view of a conventional servo circuit.

In FIG. 1, reference numeral 21 is a servo object, which has a voice coil motor (VCM) 211, servo head 212 moved by the VCM 211, and a position signal preparing circuit 213 for preparing the position signal Ps from the signal read by the servo head 212.

Reference numeral 22 is a speed detection circuit, which detects a real speed Vr from the position signal Ps and the later mentioned current sensing signal ic. Reference numeral 23 is a speed error detection circuit, which generates a speed difference $\Delta V$ between the later mentioned target speed Vc and the real speed Vr.

Reference numeral 24 is a position error detection circuit, which generates a position error signal $\Delta P$ from the position signal Ps and the current sensing signal ic and performs position control. Reference numeral 25 is a switching unit, which has a changeover switch and a power amplifier and switches connections of the speed error detection circuit 23 or position error detection circuit 24 to the servo object 11 in response to a coarse (speed control)/fine (position control) switching signal and supplies the control current Is.

Reference numeral 26 is a main processing unit, which is constituted by a microprocessor and which generates a target speed Vc in accordance with the amount of movement and also monitors the position of the servo object 21 by the later mentioned track crossing pulses to generate a signal for switching from coarse control (speed control) to fine control (position control) near the target position.

Reference numeral 27 is a current detection circuit, which detects a control current Is of the switching unit 25 and generates a current sensing signal ic. Reference numeral 28 is a track crossing pulse generating circuit, which generates track crossing pulses from the position signal Ps and outputs them to the main processing unit 26.

When the number of tracks to move (amount of movement) is given, the main processing unit 26 generates a target speed Vc in accordance with the number of tracks to move, drives the VCM 211 by speed control, and, when reaching near the target position, switches the switching unit 25 to the position control side and performs position control on the VCM 211 for positioning at the desired track.

The speed detection circuit 22 adds the current sensing signal ic and the velocity Vps produced by differentiation of the position signal Ps and generates the real speed Vr. The velocity Vps produced by differentiation of the position signal Ps, as shown by the solid line of FIG. 2A, has the characteristic of producing a peak with each track crossing pulse, but by adding the current sensing signal ic for correction, a smooth real speed Vr as shown in FIG. 2B is produced.

In the preparation of the speed signal Vr with a high speed seek (movement), the number of position signals Ps per unit time is high, as shown in FIG. 2A, and along with this there are many differential signals generated, so the gap between the speed signal Vr prepared by the speed detection circuit 22 and the actual speed is not that large.

As shown in FIG. 2C, however, when the actual speed becomes low, the number of differential signals per unit time falls and the gap with the actual speed increases. The current sensing signal ic is effective for correcting this.

In this way, the speed control is performed by supplying to the VCM 211 as the speed error signal $\Delta V$ the difference between the target speed Vc controlled by the track crossing pulses and the real speed Vr prepared from the differential signal of the position signal Ps and the current sensing signal ic.

Figure 3B:
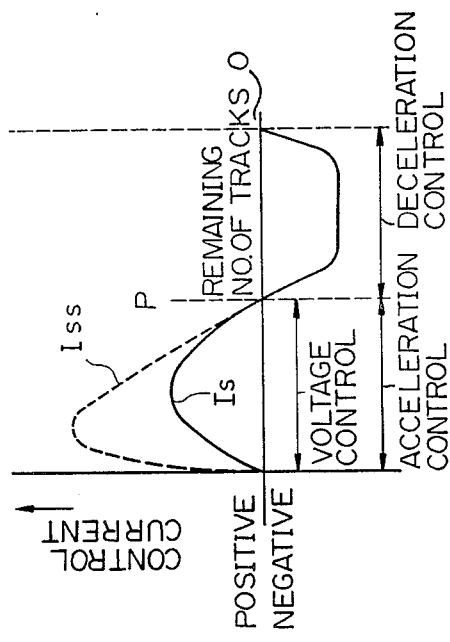
FIGS. 3A and 3B are explanatory views of the control characteristics of the conventional servo circuit.
Figure 3A:
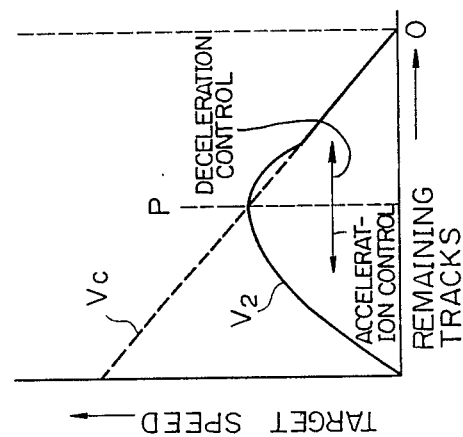

FIG. 3A shows the speed control characteristic of the conventional servo circuit explained above. Vc is the target speed, and Vr is the real speed, i.e., the actual speed.

FIG. 3B shows the characteristic of the control current Is supplied to the VCM 211. Iss is the target control current which must be passed to realize the target speed Vc, and Is is the control current which actually flows.

Acceleration control is performed until the point of time P when the real speed Vr reaches the target speed Vc. Deceleration control is performed after the point of time P. During acceleration control, as shown in FIG. 3B, a positive direction control current Is is supplied to the VCM 211, while during deceleration control, an opposite (negative) direction control current Is is supplied.

At the stage of acceleration control when accelerating at the start of speed control, the difference between the real speed of the VCM 211 and the target speed, as shown by FIG. 3A, is too great, so linear control of the control current Is flowing through the VCM 211 is not possible and voltage control is used as shown by FIG. 3B. During the period of this voltage control state, closed loop control by the servo circuit cannot be performed.

If closed loop control cannot be performed, then the control current Is for the acceleration control flows uncontrolled. Therefore, the rise of the current is large, resulting in oscillation of the VCM. At the stage of acceleration control, parasitic oscillation easily occurs and further the parastic oscillation cannot be suppressed, so turns into residual oscillation. This has the problem of reducing the seek speed and hindering high speed seek operations.

In particular, along with the increasingly higher speeds of seek operations as in recent years, the seek speed has been shortened to a value close to the cycle of the residual oscillation, making the problem of easy occurrence of residual oscillation much worse.

In the conventional servo circuit, as mentioned earlier, voltage control is performed the majority of the time at the stage of acceleration control at the time of speed control (see FIGS. 3A and 3B). At the period where voltage control is performed, closed loop control cannot be performed and the control current Is used for acceleration control flows unconditionally, so parasitic oscillation easily occurs.

The reason why the closed loop control cannot be controlled is that the gap between the target speed Vc and the real speed Vr is too large. As a result, the control current Is for acceleration use flows unconditionally and the real speed Vr is generated without relation to the target speed Vc. Therefore, if the target speed is set so as to be close to the actual speed of the servo object, then even at the stage of acceleration control, it would be possible to have closed loop control. The present invention takes note of this point and sets the target speed Vc to be close to the actual speed of the servo object so as to enable closed loop control even at the stage of acceleration control and therefore effectively suppress parasitic oscillation.

Figure 4:
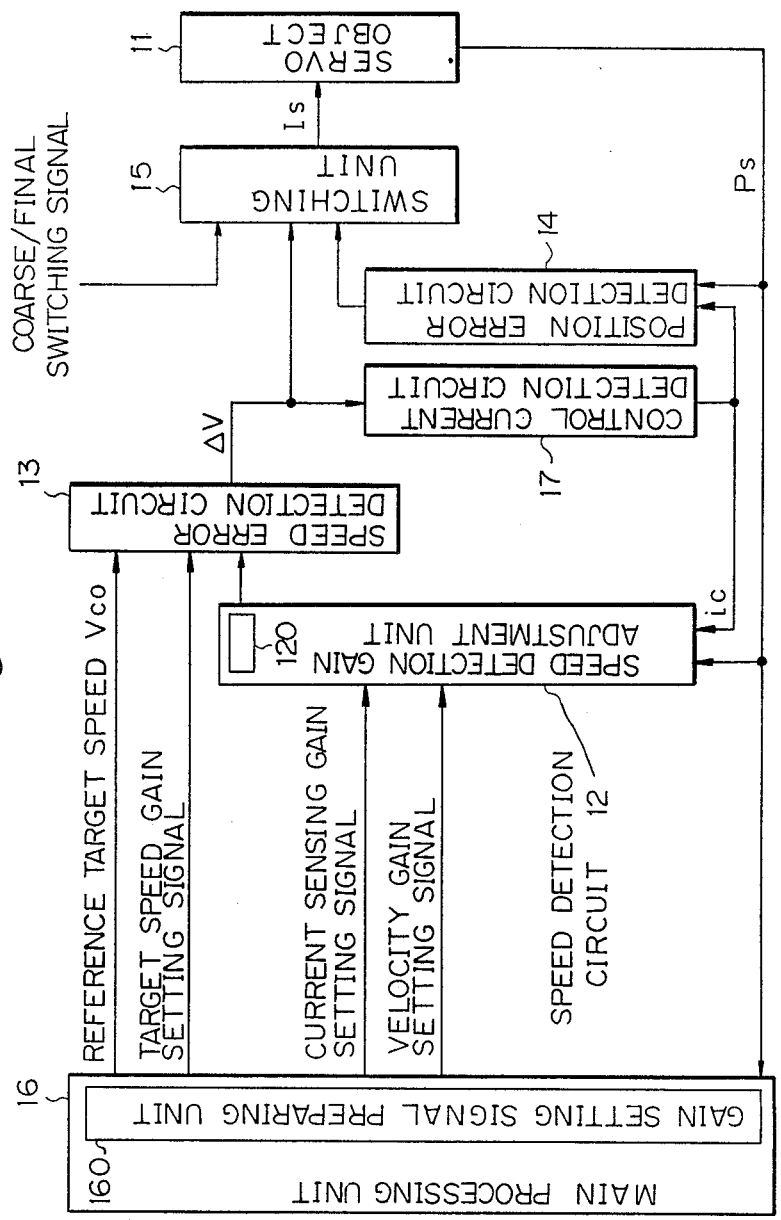
FIG. 4 is an explanatory view of the basic constitution of the present invention.

Below, an explanation will be made, with reference to FIG. 4, of the means used by the present invention to resolve the above problem. FIG. 4 is a block diagram of the basic constituents of the present invention.

In FIG. 4, reference numeral 11 is a servo object. This performs a servo operation in accordance with the control current Is input and generates a position signal Ps specifying the position to which the servo object has been moved.

Reference numeral 12 is a speed detection circuit, which finds the real speed Vr of the servo object from the velocity Vps of the servo object, found from the position signal Ps generated by the servo object 11, the later mentioned current sensing signal ic, and the detection gains of the velocity Vps and the sensing signal ic prepared by the gain setting signal preparing unit. The speed detection gain adjustment unit 120 provided in the speed detection circuit 12 will be explained later.

Reference numeral 13 is a speed error detection circuit, which generates a speed error detection signal $\Delta V$, i.e., the difference between the later mentioned target speed Vc and the real speed Vr supplied from the speed detection circuit 12.

Reference numeral 14 is a position error detection circuit, which generates a position error signal $\Delta P$ based on the position signal Ps generated by the servo object 11.

Reference numeral 15 is a switching unit, which switches connections of the servo object 11 to the speed error detection circuit 13 or the position error detection circuit 14 and supplies a control current Is corresponding to the speed error signal $\Delta V$ or the position error signal DP generated by the circuits to the servo object 11.

Reference numeral 16 is a main processing unit, which supplies various control signals, explained next, to the speed detection circuit 12 and the speed error detection circuit 13, controls the switching of the switching unit 15, and controls the operation of the overall servo circuit.

Reference numeral 17 is a control current detection circuit, which detects the control current Is generated by the switching unit 15 and generates a current sensing signal Ic proportional to the control current Is.

In the main processing unit 16, reference numeral 160 is a gain setting signal preparing unit, which prepares the detection gains of the target speed Vc, the velocity Vps detected from the position signal Ps, and the current sensing signal ic at the stage of acceleration control and prepares the detection gains set so as to increase according to a decrease of the remaining amount of the seek operation.

The main processing unit 16 supplies the reference target speed Vco and the target speed gain setting signal prepared by the gain setting signal preparing unit 160 to the speed error detection circuit 13, sets the target speed Vc to correspond to the remaining amount of the seek operation, and supplies the gain setting signals of the velocity Vps and the current sensing signal ic prepared by the gain setting signal preparing unit 160 to the speed detection circuit 12 and generates a real speed Vr corresponding to the remaining amount of the seek operation.

In the speed detection circuit 12, reference numeral 120 is a speed detection gain adjustment unit, which controls changes of the detection gains of the velocity Vps detected from the position signal Ps and the current sensing signal ic in accordance with the gain setting signals of the velocity Vps and current sensing signal ic input from the main processing unit 16.

Figure 5A:
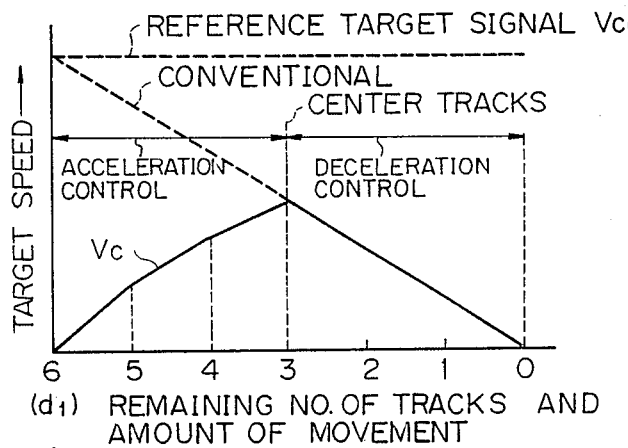
FIGS. 5A, 5B, and 5C are explanatory views of the control characteristics of the present invention.
Figure 5B:
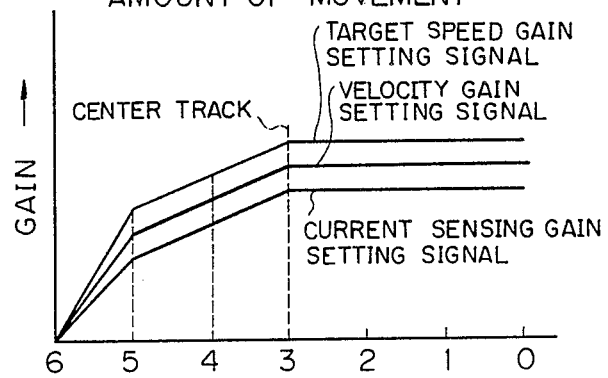
Figure 5C:
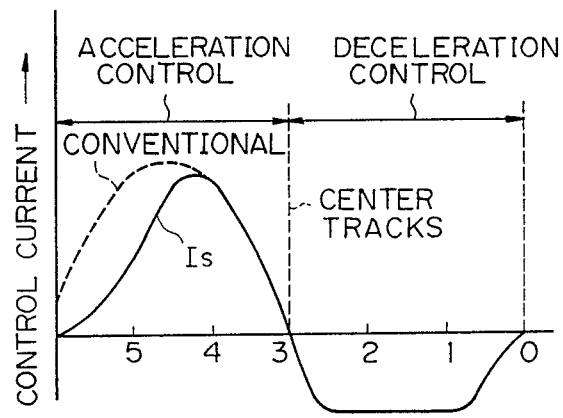

The mode of operation of the present invention will now be explained with reference to FIGS. 5A to 5C. FIGS. 5A to 5C show the control characteristics of the target speed, velocity gain setting signal, and current sensing setting signal of the present invention. FIG. 5A shows an example of the target speed control characteristic, FIG. 5B shows an example of the velocity gain setting signal and current sensing gain setting signal control characteristics, and FIG. 5C shows the characteristics of the control current Is supplied to the servo object 11.

Below, an explanation will be made of the seek control operation of the servo circuit of the present invention in accordance with the control sequence. Note that at the time of the start of the seek operation, the switching unit 15 connects the servo object 11 to the speed error detection circuit 13 side. By this, the speed control (coarse control) is performed for the first time.

[1] The main processing unit 16 finds the remaining amount of the seek operation (shown by d1) from the predetermined amount of seek operation (designated, for example, by the higher system, not shown) and the current seek position of the servo object 11 (position signal Ps) and sets the reference target speed Vco corresponding to the remaining amount of the seek operation d1. On the other hand, the gain setting signal preparing unit 160 sets the value of the gain setting signals for setting the target speed Vc, velocity Vps, and current sensing signal ic to correspond to the remaining amount of the seek operation d1. The values of the gain setting signals are set to the lowest level as shown in FIG. 5B, since the remaining amount of the seek operation d1 is large.

The main processing unit 16 sends the reference target speed Vco and target speed gain setting signal values set in this way to the speed error detection circuit 13 and sends the velocity gain setting signal and current sensing setting signal values to the speed detection circuit 12.

[2] The speed detection gain adjustment unit 121 of the speed detection circuit 12 sets the detection gains of the velocity Vps and current sensing signal ic in accordance with the gain setting signal values of the speed and current sensing input from the main processing unit 16.

The speed detection unit 12 finds (i.e. determines) the velocity Vps of the servo object from the position signal Ps generated by the servo object 11 (for example, finds it by differentiation of Ps). Next, it finds the real speed Vr of the servo object from the velocity Vps, the current sensing signal ic from the control current detection circuit 17, and the detection gains of Vps and ic set by the speed detection gain adjustment unit.

[3] The speed error detection circuit 13 finds the target speed Vc by multiplying the reference target speed Vcog and the target speed gain setting signal input from the main processing unit 13. At the start, that is, when the remaining amount of the seek operation is d1, as shown in FIG. 5A, this is calculated as the lowest value. The speed error detection circuit 13 generates the speed error signal $\Delta V$, i.e., the difference between the target speed Vc found in this way and the real speed Vr input from the speed detection circuit 12.

[4] The switching unit 15 supplies to the servo object 11 the control current Is corresponding to this speed error signal $\Delta V$.

[5] The servo object 11 performs the servo operation in accordance with the control current Is thus input and generates a position signal Ps which indicates the position to which the servo object will move.

[6] The gain setting signal preparing unit 160 of the main processing unit 16 finds the remaining amount of the seek operation from the new position signal Ps and finds the corresponding new gain setting signals of the target speed Vc, velocity Vps, and current sensing signal ic.

After this, the afore-mentioned processing or control steps [1] to [6] are repeated based on the new gain setting signal values and the next position signal Ps is generated from the results of movement of the servo object 11.

[7] After this, the processing or control steps [1] to [6] are repeated and closed loop control performed.

By this, speed control with the target speed control characteristics shown in FIG. 5A is performed.

In the stage of acceleration control, the target speed Vc is controlled so as to increase in accordance with the decrease in the remaining amount of the seek operation. Regarding the increase characteristic of the target speed Vc, if the rate of increase is increased as the remaining amount of the seek operation becomes smaller and the increase of the target speed Vc is made gradual, then good speed control results can be obtained. As the method for increasing the target speed Vc gradually, there are the method for gradual increase by the bent line characteristic as shown in FIG. 5A and also the method of gradual increase by a smooth, continuous curve, the method of mixture of the two, and the like.

When the acceleration control is completed, deceleration control is shifted to. Deceleration control may be performed, for example, by the method of deceleration, as illustrated, by the same control as in the prior art.

The point of transition P where the acceleration control is switched to deceleration control is set so as to realize excellent speed control (coarse control), but usually it is set to the intermediate point of the remaining amount of the seek operation d1.

The control characteristic of the target speed Vc is set so that [1] the seek speed is not reduced, that is, a high speed seek operation is performed, and [2] no residual oscillation is caused. However, the servo circuit is a complex fusion of an electrical system and mechanical system, so it is difficult to theoretically find the control characteristic of the target speed Vc satisfying the above conditions and the characteristic is set based on results of numerous trials.

FIG. 5A shows an example of the target speed control characteristic found in this way. When the remaining amount of the seek operation d1 is five tracks, the point of transition P from the acceleration control to the deceleration control is set to be in the middle of the remaining amount of the seek operation d1, i.e., the center tracks. The rates of increase of the speed of the target speed Vc at the stages of six, five, and four remaining tracks are set to 5, 3, and 2, for example. The deceleration characteristic is set to a linear characteristic in the same way as the prior art method.

The gain setting signals of the target speed Vc, velocity Vps, and current sensing ic are also set to increase gradually along with the decrease of the remaining amount of the seek operation (remaining number of tracks) together with the control characteristic of the target speed Vc at the stage of acceleration control. When the target speed characteristic Vc gradually increases by the bent line characteristic as shown in FIG. 5A, the gain setting signals are set to gradually increase by the same bent line characteristic of the rate of increase as shown in FIG. 5B. At the stage of deceleration control, it is held constant.

When speed control is performed in this way, the characteristic of the control current Is supplied to the servo object 11 becomes as shown in FIG. 5C. The increase of the control current Is at the point of time of the start of the acceleration control is more gradual than the prior art method, so it is possible to suppress well the occurrence of parasitic oscillation.

[8] When the speed control (coarse control) for moving the servo head 112 near to the predetermined track position is completed by the above processing and control steps [1] to [7], the main processing unit 16 commands the switching unit 15 to switch the servo object 11 to the position error detection circuit 14 side.

[9] After this, the same position control (fine control) as in the prior art is performed by the control loop of the position error detection circuit 14 → switching unit 15 → servo object 11 → position error detection circuit 14, so that the servo head 112 is correctly positioned at the center of the predetermined tracks.

In this way, at the stage of acceleration control at the speed control, the target speed is controlled to increae along with a decrease of the remaining amount of the seek operation, so at all stages of the acceleration control, closed loop control becomes possible, and it is possible to effectively suppress the occurrence of the parasitic oscillation generated at the stage of acceleration control.

In this way, the residual oscillation after the speed control can be effectively suppressed, and the seek speed can be increased to realize a high speed seek operation.

Figure 6B:
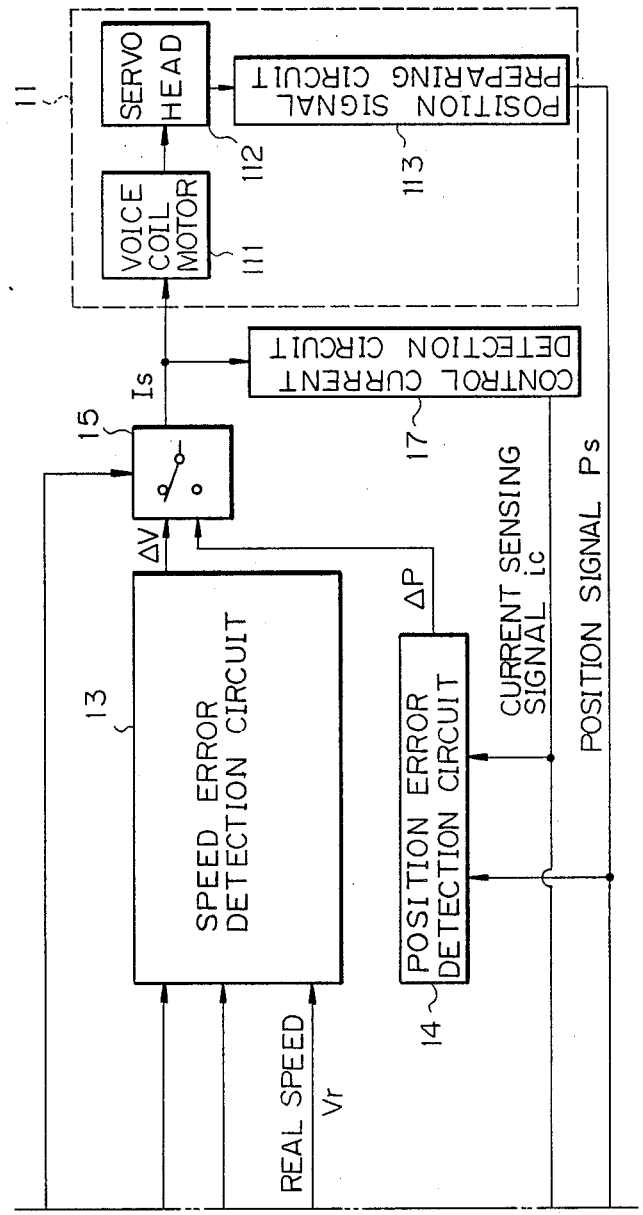
Figure 9:
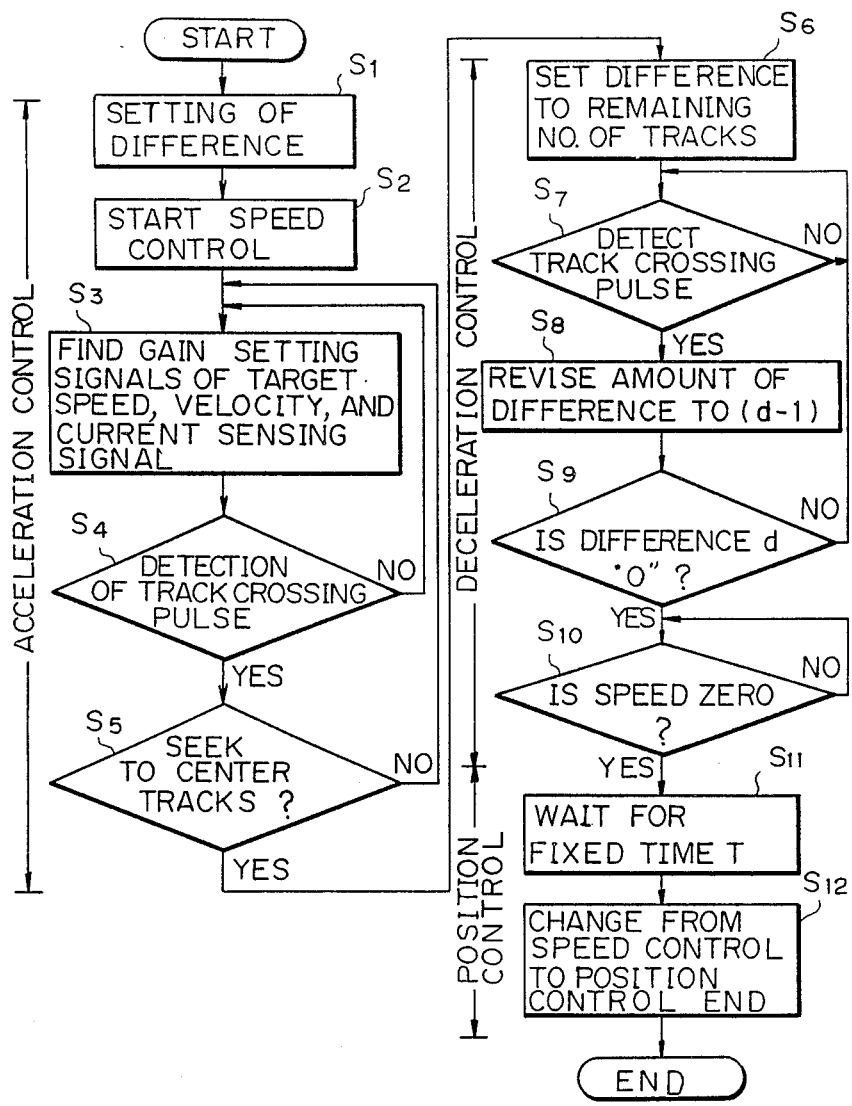
FIG. 9 is a flow chart of the operation of seek control of the same embodiment.

Next, an explanation will be made of embodiments of the present invention referring to FIGS. 5A to 5C to FIG. 9. FIG. 6 is an explanatory view of the constitution of an embodiment of the present invention; FIG. 7 is an explanatory view of the gain setting table 161 used in the gain setting signal preparing unit of the same embodiment; FIG. 8 is an explanatory view of a specific example of a speed detection circuit of the same embodiment; and FIG. 9 is a flow chart of the operation of the control of the same embodiment. The graphs of the control characteristics of FIGS. 5A to 5C are used for this embodiment too and have already been explained as to their content.

In FIG. 6, the servo head 11, speed detection circuit 12, speed error detection circuit 13, position error detection circuit 14, switching unit 15, main processing unit 16, control current detection circuit 17, target speed gain adjustment unit 120, and gain setting signal preparing unit 160 are as explained with reference to FIG. 4.

In the servo object 11, reference numeral 111 is a voice coil motor (VCM), which controls the movement of the servo object in accordance with an input control current Is. Reference numeral 112 is a servo head, which is seek controlled to a predetermined track position of the disk, not shown, and reads and writes data at that track. Reference numeral 113 is a position signal preparing circuit, which prepares the position signal Ps from the signal read by the servo head 112.

Reference numeral 18 is a track crossing pulse generating circuit, which generates track crossing pulses from the position signal Ps input from the position signal preparing circuit 113 and supplies the same to the main processing unit 16.

In the main processing unit 16, reference numeral 162 is a difference counter, which accommodates the difference between a specified track position and current track position, that is, the remaining amount of the seek operation.

Reference numeral 161 is a gain setting table, which constitutes the gain setting signal preparing unit 160. FIG. 7 shows an example of this. As explained previously, it is difficult to theoretically set detection gains of the target speed, velocity, and current sensing signal suitable for the remaining amount of the seek operation and, instead, these are determined by numerous trials for each servo circuit. Therefore, the values of the detection gains corresponding to the remaining amount of the seek operation found in this way are set in a table as shown in FIG. 7, whereby it becomes possible to immediately find the detection gains suitable for the remaining amount of a seek operation by referring to the gain setting table 161 using the remaining amount of the seek operation as an address.

In this embodiment, the remaining amount of the seek operation is shown by the remaining number of tracks. Assume there are six remaining tracks. The detection gains (below, GVc, GVps, and GIc) of the target speed Vc, the velocity Vps, and the current sensing signal ic are set so as to obtain the bent line control characteristics shown in FIGS. 5A and 5B corresponding to the remaining number of tracks. That is, when there are six remaining tracks, the rates of increase of the gains GVc, GVps, and GIc are set to 5a, 5b, and 5c (a, b, and c being constants). When there are five remaining tracks, the rates of increase are set to 3a, 3b, and 3c, while when there are four remaining tracks, the rates of increase are set to 2a, 2b, and 2c. When there are three or less remaining tracks (center tracks), the rates of increase of the gains are set to zero. The gain setting signals may be easily found from the rates of increase of the detection gains corresponding to the remaining number of tracks.

FIG. 8 shows a specific example of the speed detection circuit 12. The speed detection gain adjustment unit 120 is constituted by multiplication type digital/analog converters (DAC) 121 and 122.

Reference numeral 123 is an amplifier which amplifies the current sensing signal ic. Reference numeral 124 is a differential circuit, which differentiates the position signal Ps and generates a velocity Vps of the servo head 112, i.e., the servo object. Reference numeral 125 is an offset adjustment circuit, which adjusts the amount of offset.

DAC 121 performs digital to analog conversion on the current sensing signal ic input from the amplifier 123. This converted gain is controlled to change by the current sensing gain setting signal. The DAC 122 performs digital to analog convertion on the velocity Vps input from the differential circuit 124. The converted gain is controlled to change according to the velocity gain setting signal.

The outputs of the DAC 121, DAC 122, and offset adjustment circuit 125 are added by the resistors 127 to 129, whereby the real speed Vr is obtained. The real speed is amplified by the amplifier 126 to a predetermined level. Note that the resistors 127 to 129 are variable resistors. The gains are initially adjusted by adjusting their values.

The operation of the embodiment will now be explained in accordance with the processing steps referring to the flow chart of the control operation in FIG. 9. Note that there are six remaining tracks for the seek operation. The center tracks are made the center three tracks.

[1] Processing step S1

The main processing unit 16 finds the difference d1 from the seek track position specified from the higher system, not shown, and the current track position of the servo head 112 of the servo object 11 and sets the same in the difference counter 162. The difference is set by the number of remaining tracks and is first set to "6".

[2] Processing step S2

The main processing unit 16 switches the switching unit 15 to the speed error detection circuit 13 side and starts the speed control. First, acceleration control is performed by the processing steps S3 to S5.

[3] Processing step S3

In the acceleration control, the main processing unit 16 sets the reference target speed Vco, which corresponds to the initial value of the target speed of the conventional method.

On the other hand, the main processing unit 16 monitors the existence of track crossing pulses from the track crossing pulse generating circuit 18 by a detection interval with a shorter cycle than the minimum interval of generation of the track crossing pulses.

The gain setting signal preparing unit 160 refers to the difference counter 162 and the gain setting table 161 in the detection intervals, finds the rates of increase of the detection gains GVc, GVps, and GIc of the target speed Vc, velocity Vps, and current sensing signal ic corresponding to the remaining number of tracks (6), and calculates the value of the gain setting signals based on the rates of increase. At the time of the start of the speed control, there are six remaining tracks, the largest number, so the values of the gain setting signals of the target speed Vc, velocity Vps, and current sensing signal are set to the lowest levels as shown in FIG. 5B.

[4] Servo control

The main processing unit 16 sends to the speed error detection circuit 13 the initial speed Vco and the target speed gain setting signal value found in this way and sends the gain setting signals of the velocity Vps and the current sensing signal ic to the speed detection circuit 12.

The speed detection circuit 12 finds the real speed Vr by the constitution and operation explained in FIG. 8 based on the gain setting signal values of the current sensing signal ic input from the current detection circuit 17, the position signal Ps input from the position signal preparing circuit 113, and the velocity Vps and the current sensing signal ic input from the main processing unit and sends them to the speed error detection circuit 13.

The speed error detection circuit 13 finds the target speed Vc based on the reference target speed Vco and the target speed gain setting signal input from the main processing unit. At the time of the start of the speed control, there are six remaining tracks, the largest number, so the value of the target speed Vc becomes the lowest value as shown in FIG. 5A.

The speed error detection circuit 13 generates the speed error signal $\Delta V$, i.e., the difference between the thus found target speed Vc and the real speed Vr input from the speed detection circuit 12, and sends it to the switching unit 15.

The switching unit 15 supplies to the servo object 11 the control current signal Is corresponding to the speed error signal $\Delta V$. The VCM 111 of the servo object 11 is controlled to move the servo head in accordance with the input control current Is. The position signal preparing circuit 113 prepares the position signal Ps from the signal read along with the movement of the servo head 112.

The track crossing pulse generating circuit 18 generates a track crossing pulse from the position signal Ps and sends it to the main processing unit 16.

On the other hand, the control current detection circuit 17 detects the control current Is output by the switching unit 15, generates a current sensing signal ic proportional to the same, and sends it to the speed detection circuit 12 and the position error detection circuit.

[5] Processing S4

The main processing unit 16 monitors the existence of the input of the track crossing pulse from the track crossing pulse generating circuit 18 at the detection intervals. The detection interval is shorter than the minimum interval of generation of the track crossing pulses, so a number of detection intervals is required until the detection of the track crossing pulse for the next remaining four tracks.

[6] Reciprocative Servo Control (Processing S3 to S4)

When no track crossing pulses are detected, the processing S3 explained in the afore-mentioned [3] is performed. That is, along with the value of the target speed Vc, the gain setting signals of the target speed Vc, velocity Vps, and current sensing signal ic corresponding to the six remaining tracks are sought.

The thus found target speed Vc and the target speed gain setting signal are sent to the speed error detection circuit 13, while the gain setting signal values of the velocity Vps and the current sensing signal ic are sent to the speed detection circuit 12.

After this, at the speed detection circuit 12, the speed error detection circuit 13, the switching unit 15, the servo object 11, the control current detection circuit 17, and the track crossing pulse generating circuit 18, the same servo control as explained in the above [4] is performed. Note that the afore-mentioned detection interval corresponds to a loop interval in which processing S4 is repeated from S3.

The afore-mentioned operations including the processing S3 and the processing S4 are repeated until the next track crossing pulse (5) is detected. By this, acceleration control is performed in accordance with the control characteristics between six and five remaining tracks shown in FIGS. 5A to 5C.

[7] Processing S5

When input of a track crossing pulse is detected at processing S4, the main processing unit 16 judges if a seek operation has been performed until the center tracks (3). Since there are six remaining tracks at the present stage, the judgement is "no".

[8] Reciprocative Servo Control (Processing S2 to S5)

When it is judged at processing S4 that the seek operation has not been performed until the center tracks (3), the main processing unit 16 revises the remaining number of tracks (5) of the difference counter 162 to a value (4) discounted by exactly "1" from the remaining number of tracks (5) of the difference counter 162, returns once more to the processing S2, and performs servo control by the processing S2 to S5 until the next track crossing pulse (4) is detected.

By this, the acceleration control is performed in accordance with the control characteristics in the interval of five to four tracks shown in FIGS. 5A to 5C.

When the next track crossing pulse (4) is detected, the main processing unit 16 discounts the count (4) of the difference counter 162 by exactly "1" to change it to "3", then performs servo control by the processing S2 to the processing S5 once again.

By this, acceleration control is performed according to the control characteristics in the interval of four to three remaining tracks shown in FIGS. 5A to 5C.

At the stage of track control in the interval of four to three remaining tracks, the center track position (three remaining tracks) is reached during the loop processing by the processing S2 to S5, so at the processing S5, it is detected that the center track position is reached.

When the main processing unit 16 detects that the center tracks (3) have been reached, the acceleration control is switched to deceleration control and by the following processings S6 to S8, the same deceleration control as in the conventional servo circuit is performed.

[9] Processing S6

The main processing unit 16 sets the amount of difference to the remaining number of tracks (3). The difference counter 162 is set with the remaining number of tracks (3) at the final stage of the acceleration control, so this value (3) is used.

The main processing unit 16 sets the target speed Vc at the time of the deceleration control corresponding to the remaining number of tracks (3). The target speed Vc, as shown in FIG. 5A, is set so as to decrease corresponding to the number of remaining tracks in the same way as the target speed in the conventional method. Further, the levels of the gain setting signals of the target speed Vc, the velocity Vps, and the current sensing signal ic are held at fixed levels during the period of the deceleration control as shown in FIG. 5B.

[10] Deceleration Servo Control Operation

Using the so set target speed Vc and gain setting signals, in the same way as the afore-mentioned servo control operation, the speed detection circuit 12 generates a real speed Vr, while the speed error detection circuit 13 generates and sends to the switching unit 15 a speed error signal $\Delta V$ (negative) of the target speed Vc and the real speed Vr.

The switching unit 15 generates and sends to the object 11 a control current Is reduced from the time of acceleration control in response to the speed error signal $\Delta V$ (negative). Receiving this control current Is, the servo object 11 performs a deceleration operation, and the position signal preparing circuit 113 generates a position signal Ps. The track crossing pulse generating circuit 18 receives this position signal Ps and generates and sends to the main processing unit 16 a track crossing pulse.

On the other hand, the control current detection circuit 17, when detecting a control current Is generated by the switching unit 15, generates a current sensing signal ic and sends it to the speed error detection circuit 12 and the position error detection circuit 14.

[11] Processing S7, S8, and S9

The main processing unit 16 monitors for the existence of the input of track crossing pulses from the track crossing pulse generating circuit 18 (processing S7), and, when detecting the track crossing pulse, revises the remaining number of tracks d (3) of the difference counter 162 to D-1 (2) (processing S8). Further, it judges if the value of the difference counter 162 is "0" (processing S9). At the present stage, there are three remaining tracks, so the judgement is "no".

[12] Reciprocative Deceleration Servo Control Operation

At the processing S9, if the remaining number of tracks is not zero, the deceleration servo control operation of the afore-mentioned [10] is repeated and is reciprocatively executed until the remaining number of tracks is "0". Note that the target speed Vc is set so as to decrease linearly in proportion to the decrease in the number of remaining tracks.

By this, as shown in FIG. 5A, linear deceleration control is performed.

[13] Processing S10

If the remaining number of tracks is zero, the region near the target seek track position has been reached, so the main processing unit 16 investigates the real speed Vr generated by the speed detection circuit 12 and judges if the real speed Vr is near zero under a fixed slice.

If near zero under a fixed slice, the main processing unit 16 judges that the deceleration control is completed and the speed control is switched to position control (fine control).

[14] Processing S11 and S12

When it is detected at the processing S10 that the real speed Vr is near zero for under a fixed slice, the main processing 16 waits a fixed time T (processing S11) and commands the switching unit 15 to switch from the speed error detection circuit 13 to the position error detection circuit 14 side (processing S12).

[15] Position Control Operation

After this, position control is performed in the same way as the conventional method by the control loop of the position error detection circuit 14 → switching unit 15 → servo object 11 → position error detection circuit 14. The servo head 112 is thereby correctly positioned at the center of the designated track. This control operation is the same as in the conventional method, so a detailed explanation will be omitted.

Above, an explanation was made of the present invention using a preferred embodiment, but the present invention may be modified in many ways within the scope of the gist of the invention. These modifications are of course included in the present invention.

As explained above, according to the present invention, the following effects are obtained:

(1) At the stage of acceleration control in the speed control, control is exercised so that the target speed increases along with a decrease in the remaining amount of the seek operation, so at all stages of the acceleration control, closed loop control becomes possible and the parasitic oscillation generated at the stage of acceleration control can be effectively inhibited.

(2) From the above (1), it is possible to effectively suppress the residual oscillation after the speed control and to improve the seek speed and thus realize high speed seek operations.

I claim:

1. A servo circuit for controlling the positioning of a servo object under servo control to a target position by changing from speed control affording coarse control to position control in the vicinity of the target position, comprising:
    speed detection means for detecting a real speed based on a position signal transferred from the servo object;
    speed error detection means for generating a speed error signal representing a difference between a target speed and the real speed;
    position error detection means for generating a position error signal based on the position signal;
    switching means for switching the connection of the servo object to the speed error detection means or the position error detection means and supplying a control current to the servo object;
    control current detection means for detecting the control current and generating a current sensing signal; and
    main processing means for generating and supplying a coarse/fine switching signal to the switching means and controlling the servo object from the coarse, speed control to the position control, said main processing means further comprising gain setting signal preparing means for generating a target speed gain setting signal, a current sensing gain setting signal, and a velocity gain setting signal, and for setting detection gains of each of said gain setting signals at a stage of acceleration control so as to increase in accordance with a decrease of a remaining amount of seek operation corresponding to a remaining number of the tracks, and said main processing means supplying the target speed gain setting signal and reference target speed signal to the speed error detection circuit, and supplying the current sensing gain setting signal and velocity gain setting signal to the speed detection means,
    said speed detection means further comprises a speed detection gain adjustment unit for performing control to vary the detection gains of the velocity and current sensing gain setting signals.

2. A servo circuit as claimed in claim 1, wherein said gain setting signal preparing means comprises:
    a gain setting table storing the detection gains of the target speed, velocity and current sensing gain setting signals in accordance with the decrease of the remaining amount of seek operation, and
    a difference counter storing the difference representing the remaining seek amount between the target track and the current track.

3. A servo circuit as claimed in claim 1, wherein a rate of increase of the detection gain of the target speed, velocity and current sensing gain setting signals at the stage of acceleration control is set to decrease in accordance with the decrease of the remaining amount of seek operation.

4. A servo circuit as claimed in claim 3, wherein the vicinity of the target position corresponding to predetermined center tracks, and wherein a rate of increase of the detection gain of the target speed, velocity and current sensing gain setting signals is set to zero when the remaining amount of movement corresponds to the predetermined center tracks.

5. A servo circuit as claimed in claim 1, wherein the control current at the stage of the acceleration control is gradually increased from the start of the acceleration control.

* * * * *